June 2, 1959     K. W. MILLER     2,889,173
COMBINATION VEHICLE WHEEL AND BRAKE DRUM
Filed Aug. 17, 1956     2 Sheets-Sheet 1
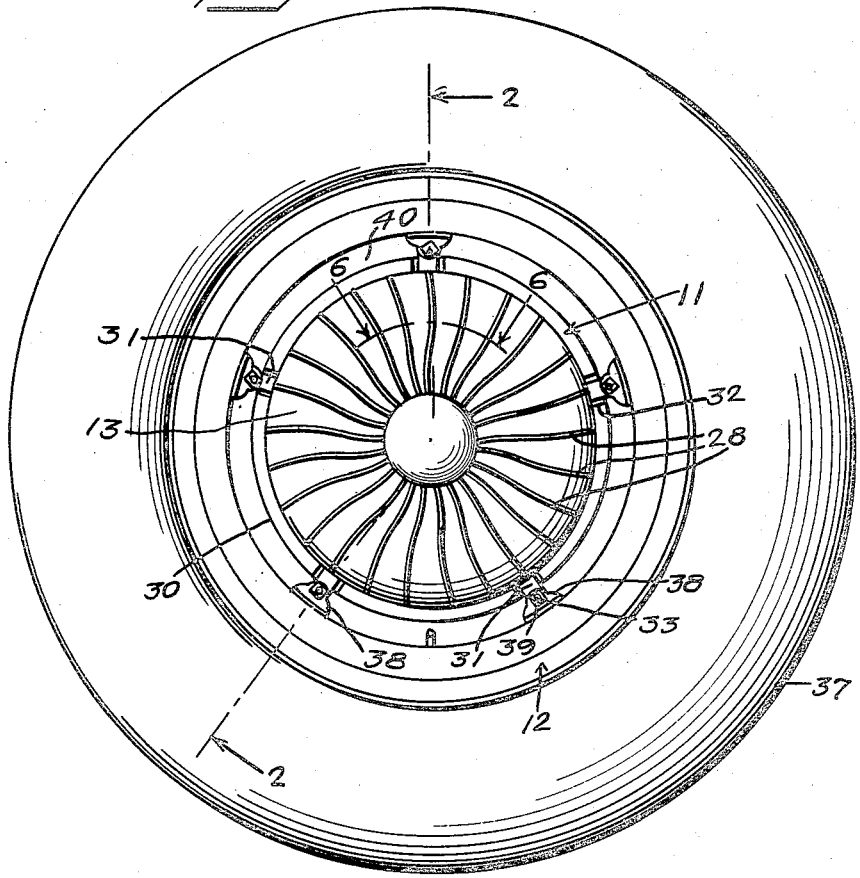
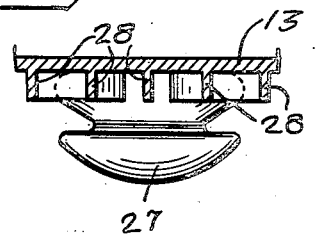
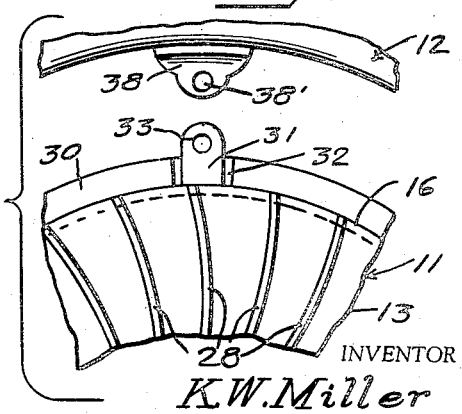
INVENTOR
K. W. Miller
BY John N. Randolph
ATTORNEY

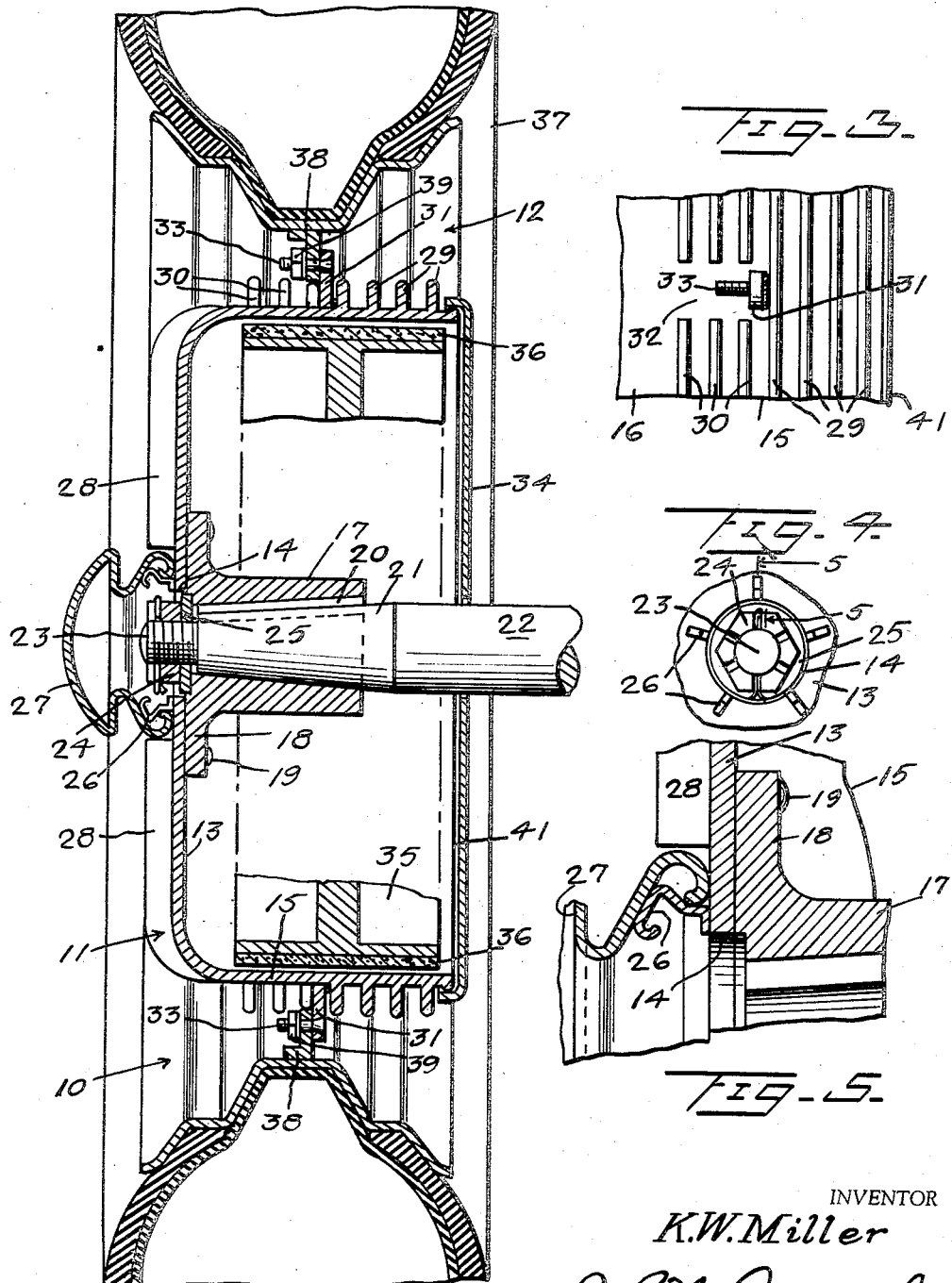

United States Patent Office 2,889,173
Patented June 2, 1959

2,889,173

COMBINATION VEHICLE WHEEL AND BRAKE DRUM

Kenneth W. Miller, Pennsburg, Pa.

Application August 17, 1956, Serial No. 604,788

1 Claim. (Cl. 301—6)

This invention relates to an improved construction of motor vehicle wheel and brake drum and has for its primary object to provide a combination brake drum and rim forming the wheel and by means of which the disc-shaped central portion of the wheel is eliminated.

A primary object of the present invention is to provide a brake drum and wheel construction by means of which the brake drum is completely exposed rather than being substantially enclosed behind a vehicle wheel, as is conventional.

A further object of the invention is to provide a brake drum the outer side and periphery of which are exposed so that air can circulate freely therearound to obtain maximum cooling of the brake drum to thus minimize wear on the brake linings and to eliminate "brake fade-out," the loss of brake effectiveness resulting from overheated brakes and commonly caused by frequent application of the brakes while the vehicle is traveling at high speeds.

Still a further object of the invention is to provide an improved combination of brake drum and wheel which will substantially increase the braking area of the drum and brake linings without requiring an increase in diameter of the brake drum, thus readily adapting the wheel and drum combination to smaller rim diameters than is now conventional with greater braking area than is now possible with present conventional wheels of larger diameter.

Still a further object of the invention is to provide an improved brake drum and wheel combination by means of which an annular air chamber is provided between the brake drum and rim to prevent heat being conducted from the brake drum to the rim and which results in increasing the temperature of the tire and resulting damage to the tire.

Still a further object of the invention is to provide a combination wheel and brake drum which may be more economically manufactured and sold than conventional wheels and which requires fewer parts without any decrease in the strength of the wheel.

Various other objects and advantages of the invention will hereinafter become more fully apparent from the following description of the drawings, illustrating a presently preferred embodiment thereof, and wherein:

Figure 1 is a side elevational view looking toward the outer side of the combination vehicle wheel and brake drum and with a pneumatic tire shown mounted on the wheel rim;

Figure 2 is an enlarged sectional view taken substantially along a plane as indicated by the line 2—2 of Figure 1;

Figure 3 is a fragmentary plan view looking toward a portion of the outer side of the periphery of the brake drum;

Figure 4 is a fragmentary elevational view of the outer side of the central portion of the brake drum, with the hub cap removed;

Figure 5 is an enlarged fragmentary radial sectional view of a central portion of the brake drum, with the hub cap applied, taken substantially along a plane as indicated by the line 5—5 of Figure 4;

Figure 6 is an enlarged fragmentary sectional view, taken substantially along a plane as indicated by the line 6—6 of Figure 1, and Figure 7 is a fragmentary exploded side elevational view showing a portion of the wheel rim disconnected and displaced away from an adjacent portion of the brake drum.

Referring more specifically to the drawings, the combination wheel and brake drum in its entirety and comprising the invention is designated generally 10 and includes a brake drum, designated generally 11, and a wheel rim, designated generally 12.

The brake drum 11 includes a disc-like front plate 13 having a central opening 14 and an annular peripheral portion 15, one circumferential edge of which is connected to the outer portion of the plate 13 by an annular portion 16 of the brake drum 11 which is curved in cross section and which is integrally connected to and integrally connects the drum portions 13 and 15.

A hub 17 has a flanged outer end 18 which is disposed against the inner side of the front plate 13, around the opening 14 thereof, and which is suitably secured thereto, as by means of fastenings 19, as seen in Figure 2. The hub 17 is connected in a conventional manner as by a spline connection 20 to a tapered end portion 21 of an axle 22. The portion 21 has the usual threaded stem 23 projecting from its outer end which extends loosely through the opening 14. A nut 24 and washer 25 are mounted on the stem 23, as is conventional, for retaining the hub 17 in tight fitting engagement on the axle portion 21.

The outer side of the front plate 13, around and adjacent the opening 14, has spring clips 26 fixed thereto and extending outwardly therefrom for detachably mounting a hub cap 27 in a conventional manner. The hub cap 27 incloses the parts which extend outwardly from the opening 14 but is very small in diameter as compared to conventional hub caps.

The outer side of the front plate 13 is preferably provided with a series of cooling fins or ribs 28 the inner ends of which are spaced outwardly from the clips 26 to accommodate a portion of the hub cap 27 between said fins 28 and the clips 26. The cooling fins 28 may extend outwardly any desired distance and may be longitudinally curved, as illustrated in Figure 1, so as to be ornamental as well as functional.

The exterior of the peripheral drum portion 15 is also provided with a plurality of spaced ribs forming cooling fins 29 and 30. The fins 29 extend circumferentially around the drum portion 15 whereas the fins 30 are of interrupted construction and are each of a length representing an arc of less than 90°. The fins 29 are located near the back of the brake drum portion 15 and the fins 30 adjacent the front thereof. A plurality of lugs 31 are fixed to and extend outwardly from the drum portion 15. The lugs 31 are disposed in circumferential alignment with one another and in circumferentially spaced apart relationship. The lugs 31 are disposed outwardly with respect to the fins 29 and inwardly with respect to the fins 30 and in alignment with gaps between adjacent ends of the fins 30, as best illustrated in Figure 3, and which gaps are designated 32. The lugs 31 extend radially outward from the brake drum periphery 15 a greater distance than the cooling fins 29 and 30, as seen in Figures 1 and 2. A stud bolt 33 is anchored in the outer end portion of each lug 31 and extends from the forward side thereof, as seen in Figures 2 and 3.

The open rear side 41 of the brake drum 11 is closed by a conventional dust cover 34 which is adapted to be supported in a conventional manner by an axle housing not shown of the axle 22. Brake shoes 35 are mounted in a conventional manner within the brake drum 11 and have brake linings 36 applied to the outer sides thereof and which are movable outwardly into contact with the inner face of the brake drum periphery 15, in any conventional manner forming no part of the present invention, for accomplishing the brake applying action.

The rim 12 is illustrated as being of a drop center type but may be of any other desired construction and a pneumatic tire 37 is shown mounted on the rim 12. The tire 37 may be of any conventional type, either tube or tubeless. The inner side of the rim 12, centrally spaced from the side edges, is provided with a series of circumferentially spaced lugs 38 which are suitably secured thereto and which extend inwardly therefrom. The lugs 38 have openings 38' to receive the studs 33 for mounting the rim 12 concentrically around and spaced outwardly from the brake drum 11 and the cooling fins 29 and 30 thereof. The rim 12 is secured detachably around the brake drum 11 by nuts 39 which threadedly engage the studs 33. Thus by removing the nuts 39 the outer rim portion 12 carrying the tire 37 can be readily removed and replaced.

As seen in Figure 2, the cooling fins 28 do not protrude outwardly beyond the rim 12 and accordingly are disposed inwardly with respect to the outer side wall of the tire 37 so that said fins 28 of the front plate 13 of the brake drum cannot be damaged by contact with a curb.

The front plate 13 and the fins 28 are formed of a material having good thermal conductivity, and preferably which can be plated or polished to produce an attractive finish so that the wheel 10 will be equally as attractive in appearance as a conventional wheel. The interior face of the brake drum periphery 15 is formed of a metal having good wear resistant characteristics, whereas the exterior portion of the drum periphery 15 and the fins 29 and 30 are preferably formed of a material possessing good thermal conductivity. It will be obvious that air will circulate freely across the outer side of the front plate 13 and between and around the fins 28 and through the space 40, between the rim 12 and fins 29 and 30, to effectively maintain the brake drum adequately cooled by dissipation of heat from the exterior of the brake drum and from the cooling fins. Thus, reduced brake effectiveness due to overheated brakes will be eliminated and the efficiency and reliability of the vehicle brake system will be materially enhanced. Additionally, wear on the contacting parts of the brake will be reduced to a minimum and heat transference from the brake drum to the rim and tire will be considerably lessened by the air space 40 therebetween.

It will also be apparent that the present invention eliminates the central or web portion of a conventional wheel which constitutes the weakest part of the wheel and by so doing increases the strength of the wheel in addition to completely exposing the brake drum so that heat can be effectively dissipated therefrom. In addition, the width of the brake drum periphery and of the brake shoes 35 and linings 36 can be greatly increased to increase the braking area several fold without requiring an increase in brake drum diameter or without increasing the width of the wheel.

The gaps 32 provide effective guide channels in applying the rim to correctly position the lugs 38 relative to the lugs 31.

Various modifications and changes are contemplated and may be resorted to without departing from the function or scope of the invention as hereinafter defined by the appended claim.

I claim as my invention:

A vehicle wheel comprising a hub having a flanged outer end, a brake drum including a substantially flat disc-like front plate having a central opening and an annular peripheral portion having a forward edge connected to an outer edge of the front plate, fastening means securing an inner portion of the front plate to the flanged end of the hub, around the front plate opening, for mounting said peripheral portion concentrically around the hub, a rim forming the outer portion of the wheel, and circumferentially spaced lugs fixed to and extending radially outward from said peripheral portion and radially inward from the rim, the lugs of the peripheral portion and rim overlapping one another, fastenings detachably securing the overlapping lugs together for detachably mounting the rim concentrically around and radially spaced from the brake drum, circumferentially extending transversely spaced cooling fins formed integral with and disposed around said peripheral portion and radially spaced from the rim, certain of said fins being disposed nearer said front plate than the lugs of the peripheral portion and other of the fins being disposed more remote from the front plate than said lugs, and fins formed integral with and extending outwardly from the front plate and disposed generally radially thereof.

References Cited in the file of this patent

UNITED STATES PATENTS

| | | |
|---|---|---|
| 1,727,486 | Sauzedde | Sept. 10, 1929 |
| 1,993,430 | Bell | Mar. 5, 1935 |
| 2,051,501 | Sorensen et al. | Aug. 18, 1936 |
| 2,160,271 | Kliersrath | May 30, 1939 |
| 2,237,481 | Ferro | Apr. 8, 1941 |
| 2,450,507 | Flogaus | Oct. 5, 1948 |
| 2,635,924 | Gregoire | Apr. 21, 1953 |

FOREIGN PATENTS

| | | |
|---|---|---|
| 265,795 | Italy | July 6, 1929 |
| 341,778 | Great Britain | Jan. 22, 1931 |